United States Patent [19]
Barzegar et al.

[11] Patent Number: 5,559,520
[45] Date of Patent: Sep. 24, 1996

[54] WIRELESS INFORMATION SYSTEM FOR ACQUIRING LOCATION RELATED INFORMATION

[75] Inventors: Farhad Barzegar, Hillsborough; Irwin Gerszberg, Kendall Park; Martin J. McGowan, III, Cranford; Robert E. Schroeder, Morris, all of N.J.

[73] Assignee: Lucent Technologies Inc., Murray Hill, N.J.

[21] Appl. No.: 312,360

[22] Filed: Sep. 26, 1994

[51] Int. Cl.⁶ .............................. H04B 7/185; G01S 5/02
[52] U.S. Cl. ............................................ 342/357; 364/449
[58] Field of Search .............................. 342/357; 364/449

[56] References Cited

U.S. PATENT DOCUMENTS 5,124,915  6/1992  Krenzel .................................... 364/420
5,334,974  8/1994  Simms et al. ........................... 340/990
5,365,450  11/1994 Schuchman et al. .................... 364/449
5,432,841  7/1995  Rimer ....................................... 379/59

*Primary Examiner*—Theodore M. Blum
*Attorney, Agent, or Firm*—Alfred G. Steinmetz

[57] ABSTRACT

An information system for automatically providing mobile vehicles with information related to their geographical location and to provide routing control information downloaded from a broadcasting or directed cellular call source includes a GPS receiver and associated data storage unit. A cellular packet data receiver is included to receive data with location markers from a transmission source. The data from the data storage unit and the received data with location markers is coupled to a controller module which includes stored program controls to select data relevant to the present geographical location and to provide centralized alerts and local readout in the mobile vehicle of this information.

2 Claims, 2 Drawing Sheets

WIRELESS INFORMATION SYSTEM FOR ACQUIRING LOCATION RELATED INFORMATION

FIELD OF THE INVENTION

This invention relates to wireless communication systems and in particular to a communication system including a geographical location system which is used to download information to a mobile vehicle specifically relevant to a geographical location of the mobile vehicle.

BACKGROUND OF THE INVENTION

Global positioning systems (GPS) are widely used in mobile vehicles to provide accurate location identification of its location in terms of geographical coordinates. Such systems operate by GPS data transmitted from GPS satellites orbiting the earth and received by a GPS receiver collocated with the mobile vehicle. Data coordinates are transmitted by the satellites and are converted by receiver equipment to geographical coordinates, latitude, longitude and height. The location of the vehicle may be continuously updated as the vehicle moves from one location to another. In some applications GPS has been combined with cellular telephone service so that a stationary monitor may call a moving vehicle and receive the vehicle's geographical coordinates in a return call over a cellular radiotelephone channel.

Cellular digital packet data transmission (CDPD) systems have become commercially available and are used to communicate data to personal communicators and to cellular receivers in mobile vehicles. Such data may be also used to transmit instructions to smart processors in the vehicle or may be used for the transmission and receipt of Faxes. This CDPD data is normally transmitted by cellular voice channels by frequency hopping techniques to avoid interference with voice traffic.

Each of these systems allow communication with mobile vehicles, especially coordinated fleets, to transmit information and to obtain location information about a particular vehicle. Often this information is obtained by voice communication by a dispatcher with a vehicle operator. It may desirable to obtain such information automatically and to automatically provide location pertinent information to the vehicle.

SUMMARY OF THE INVENTION

An information-providing system incorporates a wireless communication module operating to provide data service to a mobile vehicle utilizing GPS location coordinates and affiliated digital measurements. A wireless communication module receives location information from GPS satellites and data through a CDPD system. A mobile vehicle includes a locator which gathers information concerning its geographic location, discerns the vehicles direction and motion, reports deviation for preset operational and route thresholds and communicates such information to a dispatcher.

In a particular embodiment a location information system automatically provides mobile vehicles with information related to their geographical location and provides routing control information downloaded from a broadcasting or directed cellular call source. An onboard controller includes a GPS receiver and an associated data storage unit. A cellular packet data receiver is further included to receive data with location markers from a transmission source. The data from the data storage unit and the received data with location markers is coupled to a controller module which includes stored program controls to select data relevant to the present geographical location and to provide readout of this information in the mobile vehicle.

In an illustrative embodiment of the invention, a GPS antenna and receiver and a CDPD terminal are combined in a system with a Locator Control processor in an integrated arrangement that allows communication of information between a vehicle and a fixed station to identify the vehicle, note its location and dispatch location sensitive information to the vehicle. Transmitted information may be tailored by the user to conform to cost, quality etc. constraints. The locator control processor may be programmed to monitor a route, speed, schedule to be used by the vehicle and emit an alarm or define how these constraints are exceeded.

The locator control processor operates on a layering of software modules which may be loaded via a communication interface. In addition to a kernel module, a geographic module is supplied to use the geographic coordinates to enable a fine definition of the vehicle location enabling a definition of particular routes and intersections. A routes module installed subsequent to the geographic module enables a user to select particular viable routes of interest. A user may enter a specific route profile via the communications input or identify a route from analysis of the GPS inputs. These routes may be downloaded to and removed from the mobile vehicle as-needed by a dispatcher. An alarm module may be utilized to note a deviation from a desired route, speed, duration, a vehicle status or arrival at a particular location. Alarms, indicating deviation from some desired reference, are transmitted over the packet network to the dispatcher. Location sensitive messages may be sent by the dispatcher to the vehicle.

DETAILED DESCRIPTION

Figure 1:
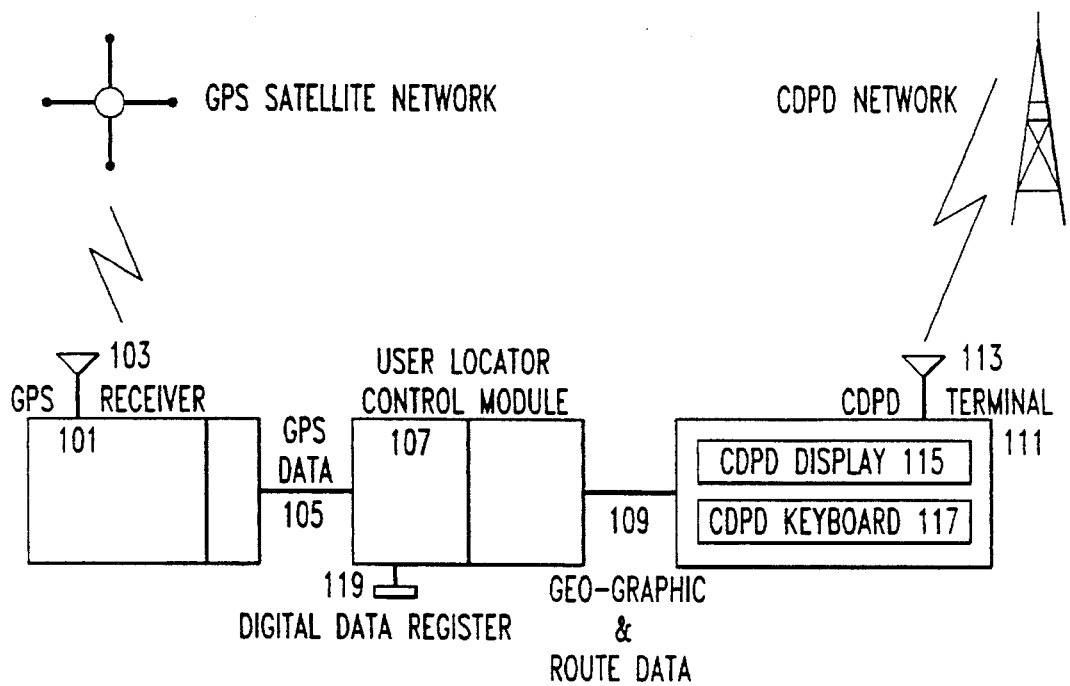
FIG. 1 is a schematic of a user location and information provider for use in a mobile environment.

In the illustrative location information communication system of FIG. 1 a wireless GPS/CDPD communication device is disclosed for inclusion in a mobile vehicle for communicating with a GPS satellite system and a CDPD data system. A location controller evaluates the data and transmits data through a wireless communicator to a desired recipient. A GPS receiver 101 includes an antenna 103 for communication with a GPS satellite network. It receives information including transmitted coordinates and converts this information to GPS data which represents; latitude, longitude, elevation and time and applies it, via channel 105, to a user locator control module 107.

A CDPD terminal 111 is included and communicates with a CDPD network, via an antenna 113, to accept down link data from the network and transmit up link data to the CDPD network. The CDPD terminal 111 includes a CDPD display 115 and a CDPD keyboard 117 to allow a user in the vehicle to interact with the CDPD network.

The locator control module 107 is connected to interface with the CDPD terminal 111 and the GPS receiver 101 and includes the necessary stored programs to respond to the data supplied by each of the GPS receiver 101 and CDPD terminal 111 and perform programmed duties. A digital data register 119 is included as a collection site for vehicle related data. As implemented, the locator control module can process data concerning position, change of position, environment data or any other vehicle specific data, supplied through the digital data register 119. The locator control module 107 includes preloaded data concerning prescribed geographic locations and selected routes of travel loaded over the geographic and route data input 109.

The locator control module includes stored program instructions to compare real time geographic and operational data with predetermined data defining location and operational information. Deviations from predetermined constraints are communicated to a dispatcher as alarms or dam. The system permits interactive communication between a dispatcher and the vehicle control module and/or its operator. The received GPS coordinates form the basis for control of the entire system.

Figure 2:
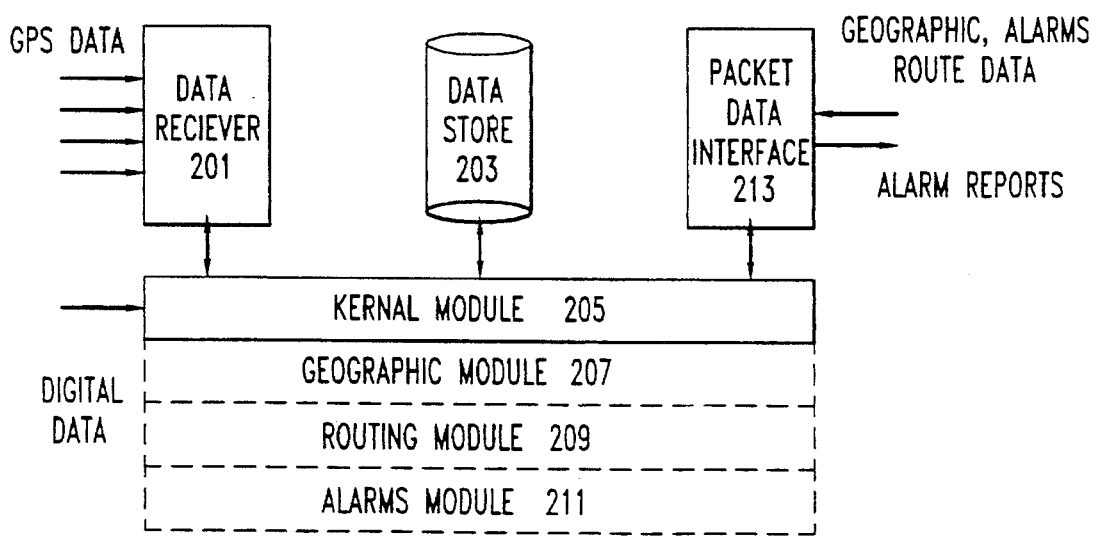
FIG. 2 is a schematic of a user locator control module used in the system of FIG. 1.

The locator control module is shown in schematic form in the FIG. 2 and as shown includes a GPS data receiver 201 which receives GPS coordinates. These coordinates are stored in the data store 203 and are processed by the kernel module 205 of the stored instructions. The kernel module 205 is the primary overall instructional control for the system and may comprise a dedicated operating system for the controller.

The processor and control module further includes the subsidiary geographical module 207 which defines geographical positioning for the system and formats this information for transmission over the CDPD network and for display on the CDPD display unit 115. The routing module 209 is operative to retain downloaded information from the CDPD network and integrate the information with geographical coordinates and maps. The Alarm module 211 provides overall system indications and notifications to the user. Packet radio connections between the CDPD network and the locator control module is via a packet data interface unit 213 which transmits and receives wireless packet dam information to serve the user.

In operation the locator control module instructs the data receiver 201 to store and records GPS data in the data store 203 at power up and subsequent thereto. The packet data interface is instructed to listen to the CDPD network and appropriate the necessary authentication data. With authenticated data received the geographical module is loaded. When finally loaded the data store 203 is prevented from further updating until a subsequent authentication is received enabling the loading of the routing module 209. The same process is repeated for the alarm module 211 thereby assuring separate security for each different layer of modules.

The vehicle operator may access this information through the keyboard of CDPD display to intervene, override if permitted, and to transmit information to the network. While the system is in operation GPS data is stored in the data store 203 in terms of geographic points or quadratic splines to prevent data overload, within tolerances defined by the alarm module 211 placed in the kernel module 205 which monitors the location response and travel of the vehicle. If the course or itinerary of the vehicle is to be changed the information may be downloaded from the CDPD network so the new limits are loaded into the alarm module 211.

The layered modules 205 to 211 include a word set vocabulary scheme to manage the available memory in the data store; allow for selective re-loading of instructions in each of the modules and to isolate communication, data-storage, retrieval and data input functions from one another.

The application layer messages over the CDPD operate with blank-separated ASCII text and is enhanced to handle serial data communications and uses a concise instruction coding scheme with incremental compilation into a word dictionary and has partitioned interruptible input/output device handlers. The authenticated user is granted the ability to manage the instruction dictionary.

Figure 3:
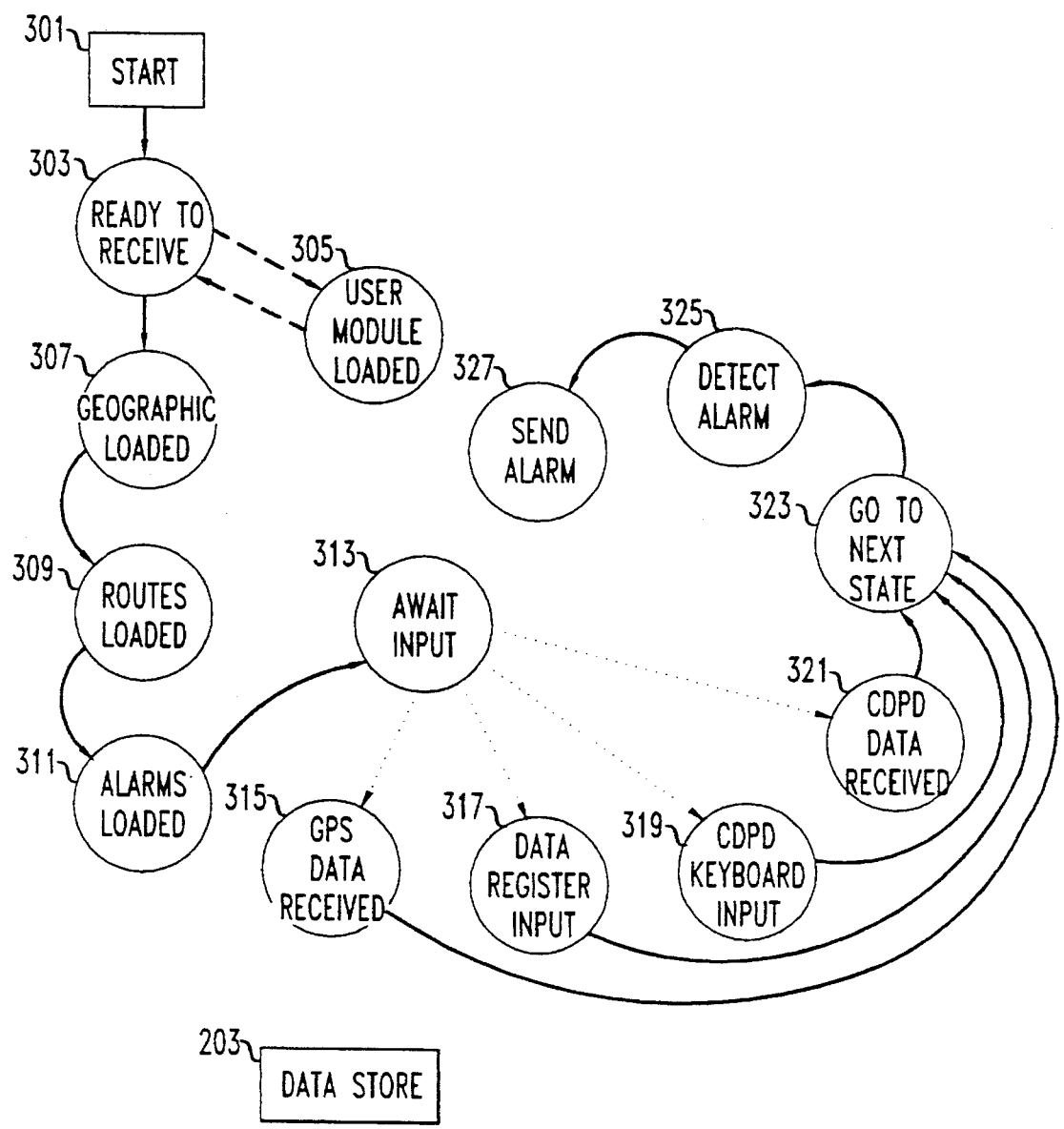
FIG. 3 is a state data flow diagram depicting the operation of the user location and information provider

Initially upon power up of the system, the kernel module 205 instructs the data receiver to record and store received GPS information in the data store 203. The packet interface 213 is instructed to tune to the data network to appropriate authentication data for this device. Upon reception of the authentication the geographic module 207 is loaded. The data store 203 is inhibited from further updates until further authentication is received, enabling the loading of the routing module 209. At this level the operator may intervene through the CDPD keyboard 117. The GPS data is stored in the data store 203 as geographic points or quadratic splines to minimize data overload. At any time the dispatcher may reload instructions into the alarm module 211 to reflect changed operating requirements The flow of the processing of the locator controller may be readily ascertained by the state diagram of FIG. 3. The flow is initiated in the state terminal 301 which is entered at power up and proceeds to the ready to receive state 303. Upon receipt of appropriate authentication, it enters the user module loaded state 305 and returns to the ready to receive state 303. On receipt of appropriate instructions, the subsequent flow proceeds to the geography loaded state 307 to receive geographic information. On completion of this state the route loaded state 309 is entered for acceptance of route acceptance information. This is followed by entry of alarm limits in the alarms loaded state 311. All data is stored in the data store 203.

The unit is now operational and enters the await input state 313. In response to an input the unit enters the related input state from the input states, GPS data received 315, data register input 317, CDPD keyboard input 319 to the CDPD data received input states 321.

The system is now advanced into the go to next state 323, and depending on the input received it may go into any of the other states. Unless otherwise directed, it goes into the detect alarm state 325 and should an alarm be detected alarms are sent as per state 327. The system now awaits new input by returning to the await input state 313.

We claim:

1. An interactive wireless information system for locating and providing location related information to and from a mobile vehicle;

a global positioning system at the mobile vehicle for receiving GPS time signals and providing coordinates indicating location of the mobile vehicle;

cellular digital packet data communication means at the mobile vehicle for communicating with a source of location pertinent information;

a controller module for integrating the coordinates and the location pertinent information including:

a data receiver for receiving location information from the global positioning system and storage means for storing the location information;

a communication interface at the mobile vehicle for exchanging digital packet data information with the cellular digital packet data communication means with the digital packet information concerning information pertinent to the location information;

a processor having a geographic module responsive to data in the storage means for geographically locating the mobile vehicle and a routes module for accepting information from the communication interface and integrating information form the geographic module and the routes module to provide location related information for readout in the mobile vehicle.

2. Apparatus for providing interactive wireless communication between an information system providing location related information and a mobile vehicle;

comprising:

the apparatus including at the mobile vehicle;

means for receiving GPS time signals and providing coordinates indicating location of the mobile vehicle;

means for communicating by cellular digital packet data techniques with a source of location pertinent information;

a controller module, for integrating the coordinates and the location pertinent information, including:

means for receiving location information as controlled and in response to the GPS time signals and derived co-ordinates from the global positioning system and storage means for storing the location information;

means for exchanging packet digital information with the cellular digital packet communication means;

means responsive to received location information in the storage means for geographically locating the mobile vehicle and a routes module for accepting information from the communication interface and integrating information form the geographic module and the routes module to provide location related information for readout in the mobile vehicle.

* * * * *